Oct. 13, 1953    E. H. RYON    2,655,177
FLOOR FURNACE VALVE
Filed May 13, 1946    3 Sheets-Sheet 1
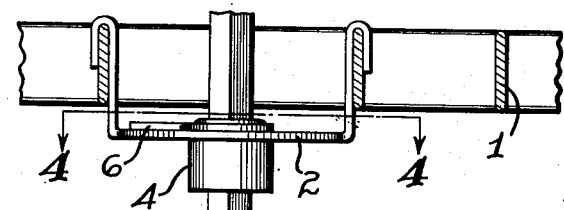
Fig. 1
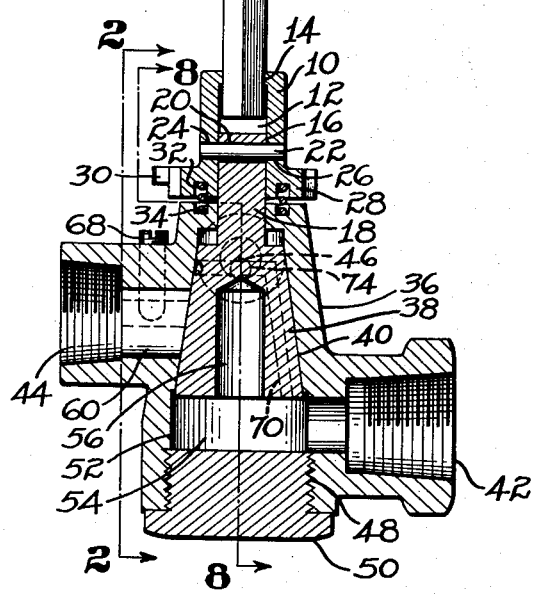
Fig. 2
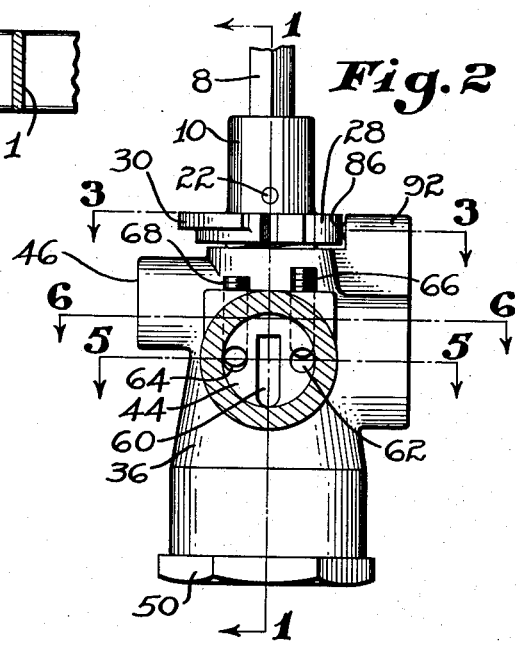
Fig. 3
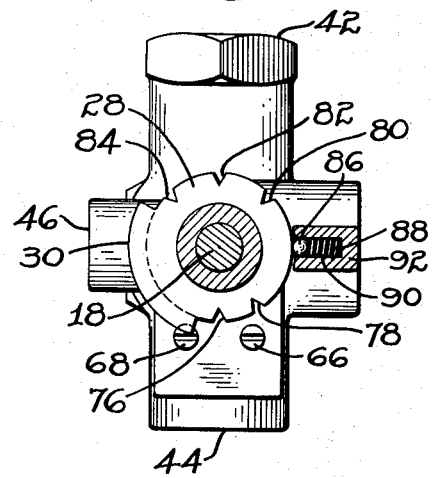
Fig. 4
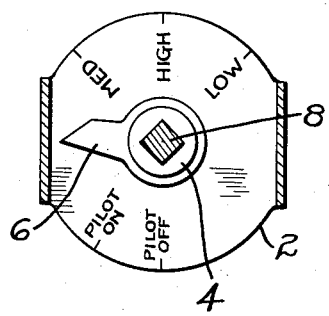
Inventor
Eppa H. Ryon
By Lyon & Lyon
Attorneys Oct. 13, 1953     E. H. RYON     2,655,177
FLOOR FURNACE VALVE
Filed May 13, 1946     3 Sheets-Sheet 2
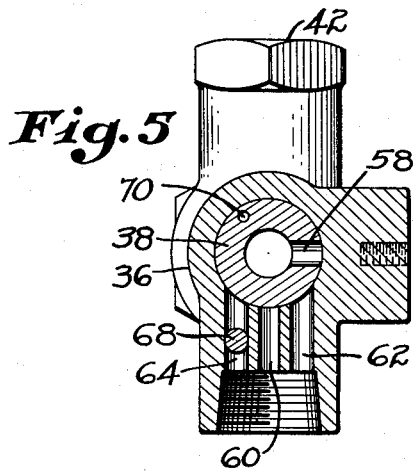
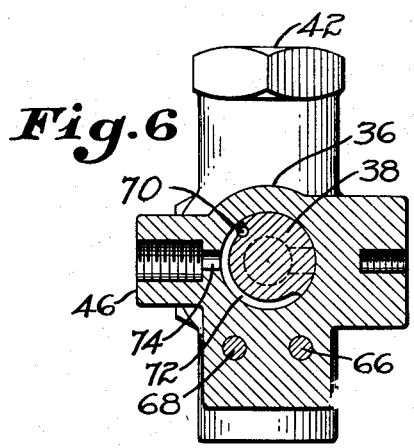
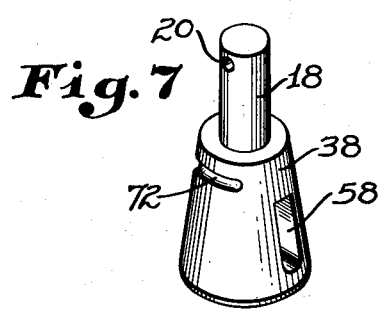
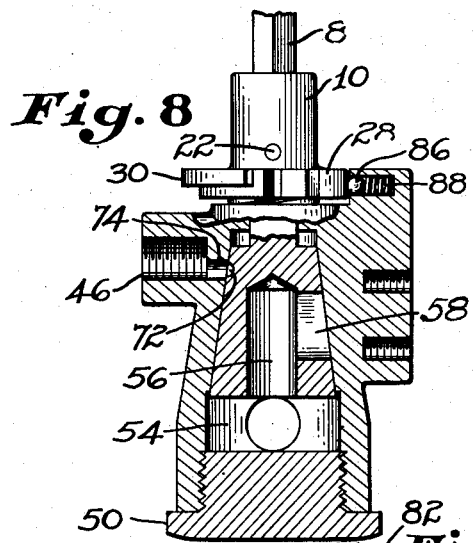
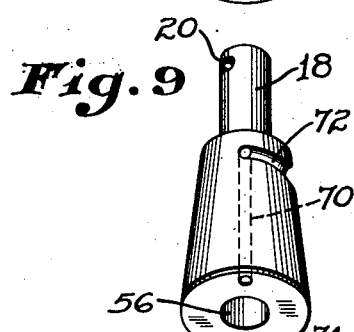
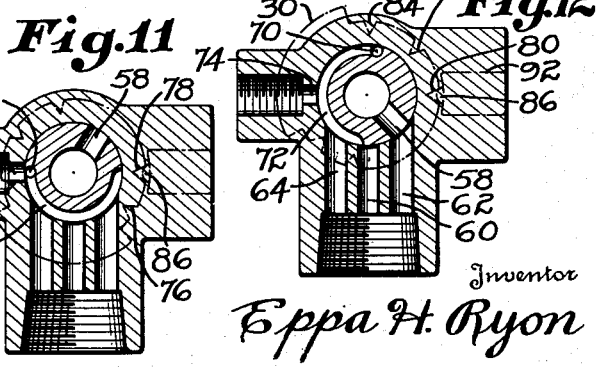
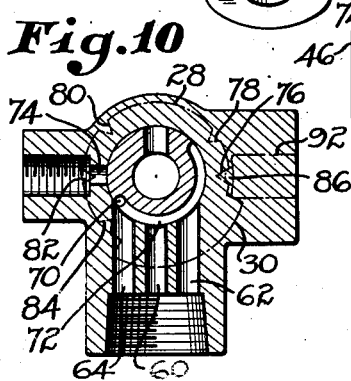
Inventor
Eppa H. Ryon
By Lyon & Lyon
Attorney

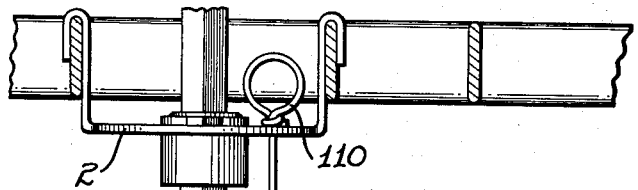
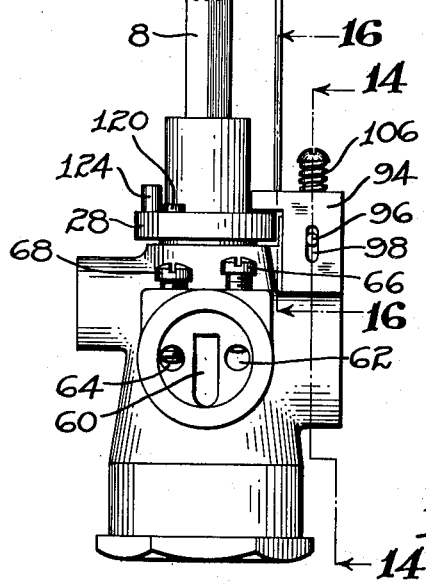
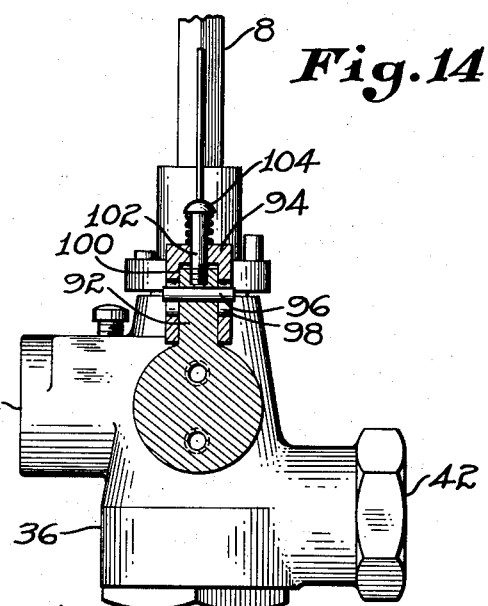
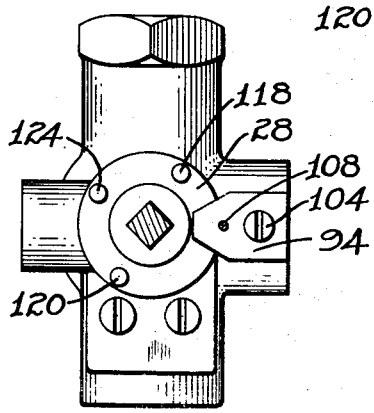
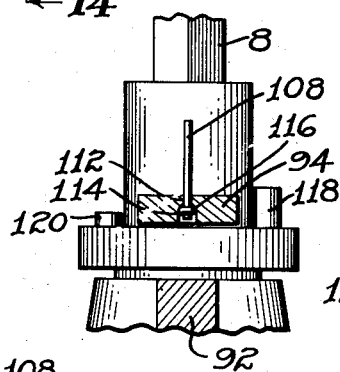
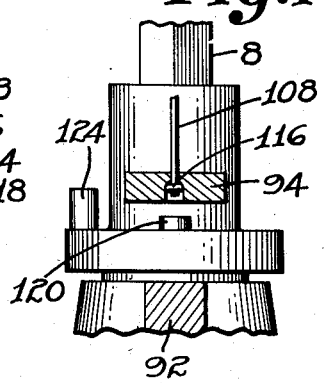

Patented Oct. 13, 1953

2,655,177

UNITED STATES PATENT OFFICE 2,655,177

FLOOR FURNACE VALVE

Eppa H. Ryon, Pasadena, Calif.

Application May 13, 1946, Serial No. 669,341

7 Claims. (Cl. 137—556)

My invention relates to furnace valves and particularly to a valve adapted for floor furnaces whereby the said valve is turned on or off or adjusted by means extending through the floor furnace grate.

It is my object to provide a valve adaptable for floor furnaces wherein both furnace and pilot gas may be controlled. By this means, I propose to obviate the necessity of having one valve for furnace gas and another valve for pilot gas.

It is my further object to provide my floor furnace valve operable from but one control, the said control extending from valve through furnace grate, thus cutting in half the two means heretofore necessary for controlling both furnace gas and pilot gas.

Another of my objects is to provide my valve of such construction that from off-position before the furnace gas may be turned on, the pilot must be turned on; and conversely, before the pilot may be turned off, the furnace gas must be turned off.

A further object of my invention is to provide a valve controlling a floor furnace wherein, in addition to full "on position," further positions of the valve are provided which permit the passing of predetermined and preadjustable amounts of gas to the furnace. Thus, my valve renders a floor furnace adjustable to serve different heats.

Other objects and advantages of my invention will be apparent from the following detailed description of the preferred embodiment thereof as illustrated in the accompanying drawings.

In the drawings:

Figure 1 shows my valve in longitudinal section along the line 1—1 of Figure 2 as it is connected to its adjusting means which are hung upon the furnace grate.

Figure 2 shows my invention in section along the line 2—2 of Figure 1.

Figure 3 is a sectional view of my valve taken along the line 3—3 of Figure 2.

Figure 4 shows a top plan view of the indicator means controlling my valve.

Figure 5 shows a section of my valve taken through the line 5—5 of Figure 2.

Figure 6 likewise shows a section of my valve taken along the line 6—6 of Figure 2.

Figure 7 shows a perspective view of my valve proper.

Figure 8 shows my valve in part section taken along the line 8—8 of Figure 1.

Figure 9 shows another perspective view of my valve proper.

Figures 10, 11, and 12 show diagrammatically three operative positions taken by my valve.

Figure 13 shows in vertical elevation a modification of my valve having a different adjusting means.

Figure 14 shows a section through my modified valve taken on the line 14—14 of Figure 13.

Figure 15 shows a top plan view of the modified means for my valve.

Figures 16 and 17 show differing operational positions for the said modified adjusting means, the views being taken on the line 16—16 of Figure 13.

Referring to the drawings, the furnace grate 1 has suspended therefrom the indicating hanger 2 which has imprinted thereon various positions of adjustment for the valve. The indicating hanger 2 is bored to receive the sleeve 4 unitary with which is the pointer 6. Keyed to the said sleeve 4 and passing therethrough is the squared shaft 8 which, of course, may carry common handle means at its topmost end which may be rotated by a common key means.

A hub 10 is provided with a bore 12 which is squared at its top 14 to receive and to key to the squared shaft 8 and which is round at 16 to receive the valve stem 18. The valve stem 18 has the bore 20 adapted to receive the pin 22 which passes through the bores 24 and 26 in the hub 10, keying the said valve stem 18 to the said hub. A notched flange 28 having an arcuate section 30 extending therefrom is provided as a part of the hub 10 for purposes later to be described.

Seated in the annular groove 32 of the hub 10 is the compression spring 34 which coacts with a similar seat in the valve housing 36. The said spring urges the hub 10 away from the said valve housing 36 and through the pin 22 and the valve stem 18 urges the tapered valve 38, which comprises a part of the said valve stem 18, against the valve seat 40, the valve housing 36 having a tapered bore.

The valve housing 36 is provided with three ports, an inlet port 42, a furnace gas outlet port 44, and a pilot gas outlet port 46. A fourth port 48 exists in the said valve housing for access to the interior of the said valve but which is plugged off by the plug 50 at the threaded bore 52. Between the said plug 50 and the valve 38 a chamber 54 within the valve housing is defined from which opens the channel 56. The channel 56 comprises an axial bore within the valve 38 and leads to the furnace gas port 44 through the slot 58. The slot 58 is positioned to register upon rotation of the valve 38 with a second slot 60 or with the orifices 62 or 64. Thus, the slot 60 and orifices 62 and 64 provide passageway through the valve housing metal between the slot 58 leading from the channel 56 and the furnace gas port 44. Two closure screws 66 and 68 coact with threaded bores in the valve housing to provide adjustable means for closing off the orifices 62 and 64.

Within the valve 38 is bored a second channel 70 which opens at a groove 72 in the tapered surface of the said valve. The groove 72 is adapted on rotation of the said valve to register with a passageway 74 through the valve housing metal to the pilot gas port 46. Thus, when the inlet port 42 is connected with the gas line, the furnace gas port 44 connected to the furnace, and the pilot port 46 connected to the pilot, it will be seen that by rotation of the square shaft 8 gas may be channeled from the chamber 54 to furnace and to pilot.

For the purpose of proper coordination of the aforementioned channeling means, I have provided the notched flange 28 having the arcuate extension 30 on the hub 10. The notches 76, 78, 80, 82, and 84 are adapted to coact with a spring-urged ball stop comprising ball 86 and compression spring 88 therebehind, both of which are inserted in the bore 90 of portion 92 of the valve housing. The arcuate extension 30 of the notched flange 28 is adapted to abut against the said portion 92 of the valve housing upon rotation of the valve and, thus, form a stop thereagainst.

Figures 10, 11, and 12 demonstrate the operation of my valve. Figure 10 shows the valve in shut-off position with no gas being delivered to either furnace or pilot. As shown, notch 76 is in coaction with the ball 86, and thus neither channel 70 nor groove 72 are in register with passageway 74. Likewise slot 58 is out of register with slot 60 and orifices 62 and 64. In this position of the valve the pointer 6 would indicate "pilot off" on the indicating hand.

In Figure 11 the notch 78 is shown coacting with the ball 86 and the channel 70 is in register with the passageway 74. This permits gas to flow from the chamber 54 to the pilot. Noting that the groove 72 is above the slot 60 and the orifices 62 and 64, as shown by Figure 6, it is seen that the slot 58 is out of register with the said slot 60 and the orifices 62 and 64. In this position the pointer 6 will register "pilot on." Figure 12 shows the notch 80 coacting with the ball 86. The groove 72 registers with the passageway 74 and in this position the slot 58 registers with the orifice 62. Thus, gas both passes to pilot and to furnace. Noting that the screw 66 is depressed less than the screw 68 and therefore closes off less of the orifice 62 than is the orifice 64 closed off, it will be seen that a relatively medium amount of gas is delivered to the furnace. In this position the pointer would indicate "Med." Similarly, by coacting the notch 82 with the ball 86, the furnace will be on "High" and by coacting the notch 84 with the ball 86, the furnace will be on "Low." In all positions from notch 78 on, it is plain that gas is delivered to the pilot and that it is impossible to shut off the pilot gas without first shutting off the furnace gas. Similarly, it is apparent that it is impossible to turn on the furnace gas without first delivering gas to the pilot.

Figures 13 to 17 show a modification of the means just described. The raised portion 92 of the valve housing 36 carries a saddle 94 which is slidably keyed to the said portion 92 by a pin 96 in the slots 98. The portion 92 of the valve housing 36 has a threadable bore 100 which receives a screw 102. Between the saddle 94 and the screw head 104 is a compression spring 106 which urges the saddle 94 down upon the portion 92 of the said valve housing. A wire 108 having an eye 110 is supported by the indicating hanger 2 and is received in a bore 112 of the saddle 94. The saddle 94 has a cut-away portion 114 in which seats a flange 116 of the said wire 108. Thus, the wire 108 upon lifting is adapted to raise the saddle 94 against the spring 106.

Instead of notches, the flange 28 carries extending pins 118, 120, and 124. These pins are adapted to abut against the saddle 94. They are so positioned that when the valve is turned clockwise to its extreme position, pin 118 will abut against the saddle 94 and the relation of elements in the valve will be the same as if on the notched flange previously shown, the notch 84 were to coact with the ball 86. It is to be noted that as pin 118 abuts against 94 in this situation, the arcuate segment 30 would abut against the raised portion 92 of the valve housing in the other embodiment, preventing further clockwise rotation of the valve. As previously indicated, gas would be delivered to the pilot and also to the furnace through the orifices 64 and the pointer 6 would indicate "Low." Carrying the rotation of the valve slightly counterclockwise to assume the position shown in Figure 15, it will be evident that the pointer will indicate "High," the slots 58 and 60 being in registry. Still further counterclockwise rotation would register the slot 58 with the orifice 62 and the pointer 6 would point to "Med." Further counterclockwise rotation brings the pin 120 to abut against the saddle 94. This moves the slot 58 out of registry with either slot 60 or orifices 62 and 64 and turns the furnace off. It must be noted, however, that the groove 72 registers with the passageway 74 in all the aforesaid positions and thus the pilot is on.

In order to turn the pilot off, the wire 108 is raised, lifting the saddle 94 against the spring 106. As is shown by the drawings, the pin 120 extends to a lesser height than do pins 124 and 118. The travel of the saddle 94 permitted by the slots 98 is such that the pin 120 may pass thereunder to the other side of the said saddle, as shown in Figure 17. The position of the valve when the pin 120 has passed under the said saddle 94 and abuts against its far side is comparable to the position of the valve in its other embodiment, as shown in Figure 11. That is, the channel 70 coacts with the passageway 74, whereas no gas is delivered to the furnace. This is indicated by the pointer as "pilot on." To turn the pilot off, the valve is rotated counterclockwise until the pin 124 finally abuts against the saddle 94. This compares with the position of elements shown in Figure 10 and indicates as "pilot off."

It is seen that in either of the embodiments of my invention the furnace cannot be on unless gas is being delivered to the pilot. When shutting off the furnace, the slot 58 is moved out of registry with its coacting elements before the groove 72 or the channel 70 is removed from the passageway 74. In turning on the valve in either embodiment, the channel 70 and groove 72 must register with the passageway 74 before any registry can be accomplished between the slot 58 and its matching elements. In addition a second advantage is present in my last-mentioned embodiment in that when turning the valve on and rotating same in clockwise direction, it is impossible for the user to accidentally turn the furnace gas on before the pilot is lit in that the pin 120 will abut against the saddle 94 to remind the user to light the pilot before proceeding to lift saddle 94 and pass the pin 120 thereunder.

Having fully described my invention, it is to be understood that I do not wish to be limited to the details herein set forth, but my invention is of the full scope of the appended claims.

I claim:

1. A furnace control mechanism comprising: a plug valve having a body member and a plug member having a pilot fuel passage including an off-center bore communicating with a peripheral groove in said plug and a furnace burner fuel passage including an axial bore communicating with a slot in said plug and an inlet passage formed in said plug member, a pilot fuel passageway and furnace burner fuel passageway adapted for registration with said groove and said slot, respectively, a stem associated with and adapted to selectively control the position of said plug, means resiliently seating said plug in said housing, a flanged hub keyed to said stem, pins on said flange, one of said pins extending a shorter distance from said flange than the others, and adjustable stop means adapted to engage each of said pins and pass beyond said pin extending a shorter distance from said flange to selectively communicate the passages in said body member with the corresponding passageways in said plug member, and a plurality of regulating means associated with said body member adapted to restrict communication between passages in the body member and corresponding passageways in the plug member.

2. A furnace control mechanism comprising: a plug valve having a body member and a plug member having a pilot fuel passage including an off-center bore communicating with a peripheral groove in said plug and a furnace burner fuel passage including an axial bore communicating with a slot in said plug and an inlet passage formed in said plug member, a pilot fuel passageway and furnace burner fuel passageway adapted for registration with said groove and said slot, respectively, a stem associated with and adapted to selectively control the position of said plug, a flanged hub keyed to said stem, pins on said flange, one of said pins extending a shorter distance from said flange than the others, and adjustable stop means adapted to engage said pins and pass beyond said pin extending a shorter distance from said flange selectively communicating the passages in said body member with the corresponding passageways in said plug member, and a plurality of regulating means associated with said body member adapted to restrict communication between passages in the body member and corresponding passageways in the plug member.

3. A furnace control mechanism comprising: a plug valve having a body member and a plug member having a pilot fuel passage including an off-center bore communicating with a peripheral groove in said plug and a furnace burner fuel passage including an axial bore communicating with a slot in said plug and an inlet passage formed in said plug member, a pilot fuel passageway and furnace burner fuel passageway in said body member adapted for registration with said groove and said slot, respectively, a stem associated with and adapted to selectively control the position of said plug, and a plurality of regulating means associated with said body member adapted to restrict communication between passages in the body member and corresponding passageways in the plug member.

4. A furnace control valve comprising: a valve housing having a plurality of ports therein, one of said ports being the main inlet port, another of said ports being the furnace burner port, and still another of said ports being a pilot port; rotatable plug means in said housing having a pilot supply pasageway and a furnace burner supply pasageway adapted to communicate with said pilot port and furnace burner port, respectively, and having a fuel passageway communicating with said main inlet port; said furnace burner port having a plurality of apertures; screw means carried by said housing adapted to control the size of selected ones of said apertures; shaft means; a hub keyed to said rotatable plug means, said hub having means for receiving said shaft; a stop carried by said housing; a flange on said hub for cooperating with said stop to limit the rotation of said rotatable plug means, said hub having notches corresponding to low, high and medium furnace heating positions and pilot "on" and pilot "off" positions; and spring urged means in said stop means for engaging said notches when said rotatable plug means is in any one of the aforesaid positions; said screw means being adapted to control the aforesaid apertures in said furnace burner port corresponding to the low and medium positions.

5. A furnace control valve comprising: a valve housing having a plurality of ports therein, one of said ports being the main inlet port, another of said ports being the furnace burner port, and still another of said ports being a pilot port; tapered resiliently seated rotatable plug means in said housing having a pilot supply passageway and a furnace burner supply passageway adapted to communicate with said pilot port and furnace port, respectively, and having a fuel inlet passageway communicating with said main inlet port, said furnace burner port having a plurality of apertures; screw means carried by said housing adapted to control the size of selected ones of said apertures; shaft means; a hub keyed to said rotatable plugs means, said hub having means for receving said shaft; a stop carried by said housing; a flange on said hub for cooperating with said stop to limit the rotation of said rotatable plug means, said hub having notches corresponding to low, medium and high furnace heating positions and pilot "on" and pilot "off" positions; and spring urged means in said stop means for engaging said notches when said rotatable plug means is in any one of the aforesaid positions; said scsew means being adapted to control the aforesaid apertures in said furnace burner port corresponding to the low and medium positions.

6. A furnace control valve comprising: a valve housing having a plurality of ports therein, one of said ports being the main inlet port, another of said ports being the furnace burner port, and still another of said ports being a pilot port; rotatable plug means in said housing having a pilot supply passageway and a furnace burner supply passageway adapted to communicate with said pilot port and furnace burner port, respectively, and having a fuel inlet passageway communicating with said main inlet port, said furnace burner port having a plurality of apertures; screw means carried by said housing adapted to control the size of selected ones of said apertures; shaft means, a hub keyed to said rotatable plug means, said hub having means for receiving said shaft; a stop carried by said housing; a flange on said hub for cooperating with said stop to limit the rotation of said rotatable plug means, said hub having notches corresponding to low, high, and medium furnace heating positions and pilot "on" and pilot "off" positions; and spring urged means in said stop means for engaging said notches when said rotatable plug means is in any one of the aforesaid positions; said screw means being adapted to control the aforesaid apertures in said furnace burner port corresponding to the low and medium positions; and an indicator rotatable by said shaft for indicating the positions occupied by said rotatable plug means.

7. A furnace control valve comprising: a valve housing having a plurality of ports therein, one of said ports being the main inlet port, another of said ports being the furnace burner port, and still another of said ports being a pilot port; rotatable means in said housing for controlling said ports; said rotatable means having an annular recessed passage adapted to communicate with said pilot port and a longitudinally extending passage connecting between said annular recessed passage and the bottom of said rotatable means and a laterally extending recessed slot adapted to communicate with said furnace burner port and having a full inlet passageway connected with said main inlet port; said furnace burner port having a plurality of apertures; screw means carried by said housing adapted to control the size of selected ones of said apertures; shaft means; a hub keyed to said rotatable means, said hub having means for receiving said shaft; a stop carried by said housing; a flange on said hub for cooperating with said stop to limit the rotation of said rotatable means, said hub having notches corresponding to low, high and medium furnace heating positions and pilot "on" and pilot "off" positions; and spring urged means in said stop means for engaging said notches when said rotatable means is in any one of the aforesaid positions, said screw means being adapted to control the aforesaid apertures in said furnace burner port corresponding to the low and medium positions.

EPPA H. RYON.

References Cited in the file of this patent
UNITED STATES PATENTS

| Number | Name | Date |
|---|---|---|
| 1,466,269 | Butler | Aug. 28, 1923 |
| 1,630,781 | Burman | May 31, 1927 |
| 1,672,590 | Ward | June 5, 1928 |
| 1,707,007 | Harper | Mar. 26, 1929 |
| 1,757,126 | Maier | May 6, 1930 |
| 2,284,994 | Stuckenholt | June 2, 1942 |
| 2,298,771 | Lamar | Oct. 13, 1942 |
| 2,410,488 | Fagan | Nov. 5, 1946 |
| 2,416,814 | Borse | Mar. 4, 1947 |
| 2,457,779 | Kincaid | Dec. 28, 1948 |